April 5, 1955 M. W. P. STRANDBERG 2,705,756

AUTOMATIC FREQUENCY CONTROL SYSTEM

Filed March 21, 1946

INVENTOR.
MALCOM W. P. STRANDBURG

BY M. C. Hayes

ATTORNEY

United States Patent Office 2,705,756

Patented Apr. 5, 1955

2,705,756

AUTOMATIC FREQUENCY CONTROL SYSTEM

Malcom W. P. Strandberg, Cambridge, Mass., assignor, by mesne assignments, to the United States of America as represented by the Secretary of the Navy Application March 21, 1946, Serial No. 655,987

6 Claims. (Cl. 250—36)

This invention relates to automatic frequency control circuits, and more particularly to circuits for controlling the output frequency of velocity modulation type oscillators.

Velocity modulated oscillators of the so-called "reflex" type are commonly employed as the local oscillator in receivers for pulse type radar systems. Because of the short time duration of the signal pulses from such radar systems automatic frequency control (AFC) circuits having a rapid response to shifts in signal frequency are needed. Conventional AFC circuits for these applications employ a discriminator connected into an intermediate frequency (I. F.) stage of the receiver. This discriminator generates output signal pulses which vary in magnitude as a function of the departure of the I. F. from the desired mean value, and which vary in polarity depending upon the direction of that departure. The output obtained from the discriminator is used to control a D. C. amplifier which in turn shifts the potential on the reflector electrode of the reflex oscillator to provide a proper output frequency. It is also conventional practice to use a D. C. amplifier which in the absence of signals from the discriminator will sweep the reflector potential throughout the tuning range, and which will lock its output potential at the proper value in response to a signal from the discriminator. For this purpose transitron oscillators have been used, but have been lacking in flexibility in that they had to be designed to operate within a specified range of voltage output from a discriminator. It was also necessary that the discriminator be carefully designed to have a sharp "crossover point." By the term "crossover point" is meant the point where the output of the discriminator is equal to zero.

In many radar receivers it is necessary to maintain the cavity of the reflex oscillator at ground potential. This requires that the reflector be at a high negative potential, and introduces difficulties in coupling the control voltage from the AFC circuit to the reflector electrode. In the present invention the transitron oscillator is A. C. coupled to the output of the discriminator, making it possible to connect the output of the AFC circuit directly to the oscillator reflector.

Accordingly, it is a principal object of this invention to generally improve circuits for the automatic control of the output frequency of velocity modulated oscillators.

It is also an object of this invention to provide an automatic frequency control circuit from which the output may be obtained at any desired potential level.

Another object of this invention is to provide an automatic frequency control circuit utilizing some point in the output of the discriminator other than the "crossover point" as the equilibrium point.

The above and further objects of this invention will be apparent by reference to the following detailed description when taken with the appended drawings of which:

The operation of the embodiment of Fig. 1 may be explained broadly as follows. The output pulses from a conventional discriminator are fed to a pulse amplifier. Since the circuit is to be operated about an equilibrium point to one side of the crossover of the discriminator the input to the pulse amplifier consists, in this embodiment of unipolar negative pulses. The amplified pulses, now positive, are A. C. coupled through an R-C circuit to the plate of a clamping diode. Due to the long time constant of the R-C coupling circuit the D. C. voltage appearing at the plate of the diode will be negative with respect to the cathode voltage, and will be substantially equal in magnitude to the peak of the amplified pulses. The plate of the diode is coupled to the control grid of a transitron oscillator, and the D. C. voltage so applied causes the transitron oscillator to lock in at a point where its grid voltage will be equal to the impressed voltage. The output obtained from the plate circuit of the transitron oscillator is used to control the reflector potential of the reflex oscillator. Since the output of the discriminator is A. C. coupled to the transitron oscillator, the output from the circuit may be obtained at any desired voltage level, by varying the voltage applied to the cathode of the clamping diode, the only further requirement being that the potential between the plate and the cathode of the transitron oscillator must be the proper operating value.

Figure 1:
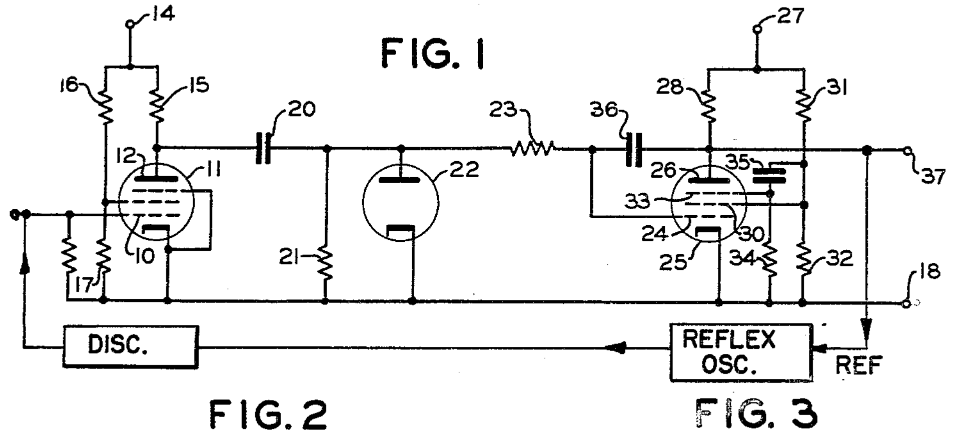
Fig. 1 is a schematic diagram of one embodiment of the invention.

Referring to Fig. 1 the negative voltage pulses from a conventional discriminator are applied to the control grid 10 of pentode electron tube 11 which is connected as a pulse amplifier. Plate 12 of tube 11 is connected to a source of positive voltage at terminal 14 through resistor 15, and the screen grid is maintained at proper operating potential by means of a voltage divider consisting of resistors 16 and 17 connected between the same positive potential source and the cathode. The suppressor grid is coupled directly to the cathode and both are connected to a negative voltage source at terminal 18. The input pulses appear amplified and inverted at plate 12 of tube 11, and are capacitance coupled by means of a coupling circuit consisting of condenser 20 and resistor 21 to the plate of a diode electron tube 22. The cathode of tube 22 is connected to the negative voltage source at terminal 18. The time constant of condenser 20 and resistor 21 is very long compared to the interpulse interval resulting in a voltage at the plate of diode 22 which is negative, and substantially equal in magnitude to the peak value of the pulses from amplifier tube 11, when taken in reference to the cathode voltage of tube 22. The plate of tube 22 is coupled through resistor 23 to the control grid 24 of a pentode electron tube 25, which is connected as a transitron oscillator. The plate 26 of pentode 25 is coupled to a positive potential source at terminal 27 through resistor 28, and screen grid 30 is connected to the junction of resistors 31 and 32 which form a voltage divider between the positive voltage source at terminal 27 and the negative voltage source at terminal 18. The suppressor grid 33 is connected to the cathode through resistor 34 and to screen grid 30 through condenser 35. Plate 26 is coupled to control grid 24 through condenser 36, and directly to output terminal 37. The voltage established at the plate 26 of pentode 25 due to signals from clamping diode 22 is used to control the reflector potential of the reflex oscillator. In the foregoing and following descriptions the voltages at terminals 14 and 27 are referred to as positive with the understanding that these voltages are positive with respect to the voltage applied at terminal 18. The voltages at terminals 14, 18, and 27 with respect to ground will be determined by the potential level about which the reflector of the reflex oscillator must be operated.

Figure 2:
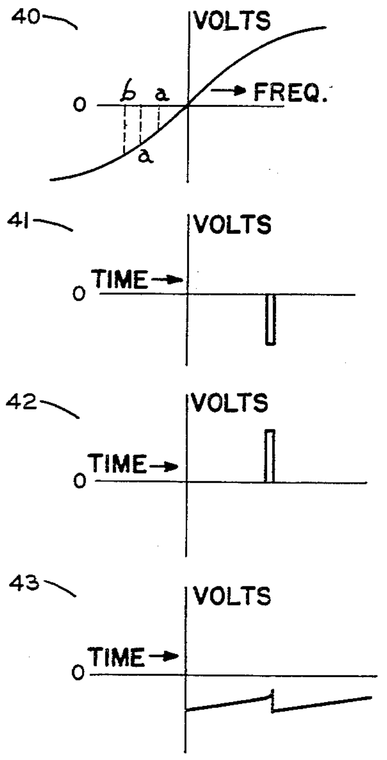
Fig. 2 is a set of voltage wave forms which would be obtained from the coupling circuit of Fig. 1.
Figure 3:
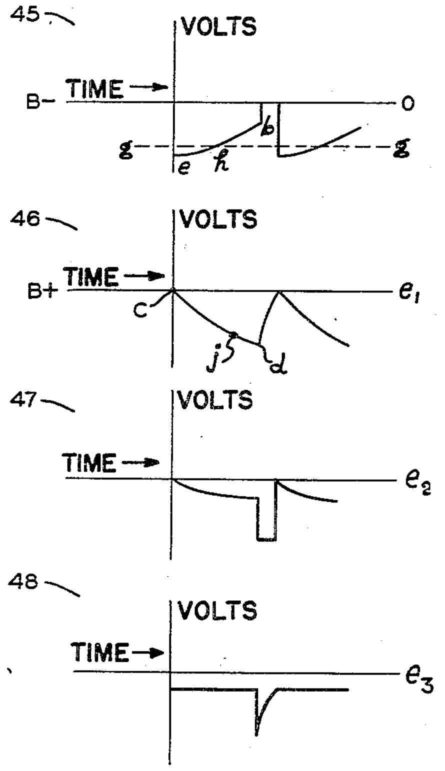
Fig. 3 is a set of voltage waveforms which would be obtained from a free-running transitron oscillator.

The action of the circuit of Fig. 1 may be more clearly understood by reference to the voltage wave forms of Figs. 2 and 3. In Fig. 2 curve 40 is a graph of the output voltage of the discriminator as a function of frequency. In this application the normal operating range lies between points *a* and *b* on the negative side of the crossover point. Wave form 41 is the voltage pulse output of the discriminator which is applied to grid 10 of pentode 11. The magnitude of pulse 41 is determined by the input frequency of the discriminator. Wave form 42 is the voltage pulse of wave form 41 amplified and inverted which appears at plate 12 of tube 11. For the duration of this pulse diode 22 will conduct causing condenser 20 to charge rapidly. During the interpulse interval condenser 20 will discharge slowly through resistor 21, the combined action of diode 22, condenser 20 and resistor 21 causing a voltage wave form shown as curve 43 to appear at the plate of diode 22. This voltage is applied to the control grid 24 of pentode 25.

In Fig. 3 wave forms 45, 46, 47, and 48 refer to the operation of pentode 25 as a free running transitron oscillator. Wave form 45 is the voltage appearing at control grid 24, curve 46 is the wave form of the voltage wave appearing at plate 26, curve 47 is the voltage wave at screen grid 30, and curve 48 is the voltage wave at suppressor grid 33, respectively. The operation of the transitron oscillator may be described as follows. Assuming tube 25 to be conducting, plate current will flow therein and the voltage at plate 26 will drop as shown in the region between points *c* and *d* on curve 46. The voltage drop will be due to plate current flowing through resistor 28 and also through the circuit consisting of condenser 36, resistor 23 and resistor 21. Due to the presence of condenser 36 in the circuit the rate of drop of the plate voltage will be determined by the relation $$C\,(R_1+R_2)$$

where:

$C$=the input capacitance of the transitron oscillator. Due to the Miller effect this is equal to the grid to plate capacitance multiplied by the amplification of the tube. The grid to plate capacitance is, for all practical purposes equal to the capacitance of condenser 36.
$R_1$=the value of resistor 21.
$R_2$=the value of resistor 23.

The plate voltage will continue dropping along the exponential of curve 46 until the point *d* is reached. During this period of dropping plate voltage the grid voltage (curve 45) will increase slowly toward the cathode potential because of the decreasing current through condenser 36. When point *d* is reached screen grid 30 begins to attract electrons which would normally go to plate 26, and the screen current increases sharply. This increased screen current is drawn through resistor 31 causing a drop in the screen voltage as shown in curve 47. The drop in screen voltage is coupled by condenser 35 to suppressor grid 33, and causes a further decrease in the current to plate 26. The action is very rapid and the voltage at suppressor 33 drops sufficiently to cut off the tube with respect to plate current. The tube is held in this cut-off condition until condenser 35 can charge and restore the suppressor voltages as shown by curve 48. During the cut-off period condenser 36 will charge through the grid-cathode resistance of tube 25 and resistor 28 toward the potential at terminal 27. The charging time for condenser 36 is much shorter than the discharging time because tube 25 is cut off and the value of the capacitance is not multiplied by the gain of the tube and hence, the rise in plate voltage is quite rapid as shown in curve 46. When condenser 35 has charged sufficiently to restore the suppressor voltage to its normal value the tube will again begin to conduct, and the oscillator will repeat the cycle.

The action of the plate voltage of diode 22 in controlling the output of pentode 25 may be seen with particular reference to curve 45 (Fig. 3). Between points *e* and *b* of curve 45 is a region in which a control voltage may be applied to lock in the oscillator at some point in its cycle. If the potential at the plate of diode 22 has a value as given by line *g*—*g* (curve 45) grid 24 will have its potential fixed at point *h*. The potential at plate 26 will then have a constant value as shown by point *j* on curve 46 and the potential on the reflector electrode of the reflex oscillator is thus determined. If the frequency of the input signals to the discriminator should shift, the magnitude of the input pulses to tube 11 will change. This will change the position of point *j* along curve 46 and will result in a shift in the output potential at terminal 37 in a direction which will bring the oscillator frequency to the correct value. The potential with respect to ground about which the control voltage is varied may be changed by altering the voltage applied at terminal 18, so that the circuit may be used with a large variety of reflex oscillators. In the absence of received signals pentode 25 will oscillate in the manner described, sweeping the control voltage, and hence the local oscillator frequency throughout the desired range.

When a signal is obtained the circuit will lock in at the frequency of this signal.

While a particular embodiment of this invention has been disclosed and described, it is to be understood that various changes and modifications may be made therein without departing from the spirit and scope thereof as set forth in the appended claims.

What is claimed is:

1. In a radio receiver comprising a local oscillator and a discriminator circuit, apparatus for controlling the frequency of said local oscillator comprising, a pulse amplifier adapted to receive the output pulses of said discriminator circuit, a long time constant resistance-capacitance circuit, an electron tube connected in parallel with the resistive element of said resistance-capacitance circuit, a voltage source connected to said electron tube to establish a reference voltage level, the combination of said resistance-capacitance circuit and said electron tube converting the output pulses of said pulse amplifier to a substantially constant control voltage with respect to said reference voltage level, the magnitude of said control voltage being a function of the input frequency to said discriminator circuit, a transitron oscillator adapted to be locked at a point in its cycle of oscillation by said control voltage, and means for applying the output from said transitron oscillator to said local oscillator for controlling the frequency of said local oscillator.

2. In a radio receiver comprising a local oscillator and a discriminator circuit, apparatus for controlling the frequency of said local oscillator comprising, a first electron tube having at least an anode, a cathode, and a control grid, said first electron tube being connected as a pulse amplifier adapted to receive the output pulses of said discriminator circuit, a long time constant resistance-capacitance circuit, a second electron tube having at least a cathode and an anode connected in parallel with the resistive element of said resistance capacitance circuit, a voltage source connected to said second electron tube to establish a reference voltage level, the combination of said resistance-capacitance circuit and said second electron tube converting the output pulses of said pulse amplifier to a substantially constant control voltage with respect to said reference voltage level, the magnitude of said control voltage being a function of the input frequency to said discriminator circuit, a third electron tube having at least a cathode, an anode and a control grid, said third electron tube being connected as a transitron oscillator, said control voltage being applied to the control grid of said third electron tube, the magnitude of said control voltage determining the plate potential of said third electron tube, and an output circuit for applying the plate potential of said third electron tube to the local oscillator.

3. In a radio receiver comprising a local oscillator and a discriminator circuit, apparatus for controlling the frequency of said local oscillator comprising, a first electron tube having at least an anode, a cathode, and a control grid, said first electron tube being connected as a pulse amplifier adapted to receive the output pulses of said discriminator circuit, a long time constant resistance-capacitance circuit, a second electron tube having at least a cathode and an anode connected in parallel with the resistive element of said resistance-capacitance circuit, the capacitive element of said resistance-capacitance circuit being connected between the anode of said first electron tube and the anode of said second electron tube, a voltage source connected to the cathode of said second electron tube to establish a desired reference voltage level, the combination of said resistance-capacitance circuit and said second electron tube converting the output pulses of said pulse amplifier to a substantially constant control voltage with respect to said reference voltage level, the magnitude of said control voltage being a function of the input frequency to said discriminator circuit, a third electron tube having at least a cathode, an anode, and a control grid, said third electron tube being connected as a transitron oscillator, the control grid of said third electron tube being resistively coupled to the plate of said second electron tube, the magnitude of said control voltage determining the plate potential of said third electron tube, and an output circuit adapted to apply the plate potential of said third electron tube to the reflector electrode of a said local oscillator.

4. Apparatus for controlling the frequency of an oscillator in accordance with the amplitude of signal impulses applied thereto comprising, means for obtaining a substantially constant potential in response to the application thereto of said signal impulses, a transitron oscillator adapted to be locked at a point in its cycle by said substantially constant potential, and means for applying the output of said transitron oscillator to said first-mentioned oscillator for controlling the frequency of said first-mentioned oscillator.

5. Apparatus for controlling the frequency of an oscillator in accordance with a variation in the amplitude of signal pulses applied thereto comprising, means for rectifying said pulses, a transitron oscillator adapted to be locked at a point in its cycle in response to the application thereto of a potential falling within a predetermined range, means for applying said rectified pulses to said transitron oscillator, and means for applying the output of said transitron oscillator to said first-mentioned oscillator for controlling the frequency of said first-mentioned oscillator.

6. Apparatus for controlling the frequency of an oscillator in accordance with a variation in the amplitude of signal pulses applied thereto comprising, means responsive to said pulses for obtaining a substantially constant control potential, the magnitude of said control potential being a function of the amplitude of said signal pulses, a transitron oscillator adapted to be locked at a point in its cycle in response to the application thereto of a control potential falling within a predetermined range, said transitron oscillator also being adapted to be free-running for values of control potential outside of said predetermined range, means for applying said control potential to said transitron oscillator, and means for applying the output of said transitron oscillator to said first-mentioned oscillator for controlling the frequency of said first-mentioned oscillator, the output of said transitron oscillator being a predetermined function of the amplitude of said input signal.

References Cited in the file of this patent

UNITED STATES PATENTS

| | | |
|---|---|---|
| 2,389,004 | Schroeder | Nov. 13, 1945 |
| 2,391,090 | Goldsmith | Dec. 18, 1945 |
| 2,414,228 | Gottier | Jan. 14, 1947 |
| 2,434,294 | Ginzton | Jan. 13, 1948 |
| 2,463,685 | Frendendall et al. | Mar. 8, 1949 |

OTHER REFERENCES

"The Transitron Oscillator" by Brunetti. Reprint from Proc. IRE, vol. 27, No. 2, February 1939; pages 88–93.